United States Patent
Chandebois

(10) Patent No.: US 6,568,262 B1
(45) Date of Patent: May 27, 2003

(54) DEVICE FOR DETECTING FUEL INPUT IN A MOTOR VEHICLE TANK

(75) Inventor: Michaël Chandebois, Villepinte (FR)

(73) Assignee: Peugeot Citroen Automobiles SA, Neuilly sur Seine (FR)

(*) Notice: Subject to any disclaimer, the term of this patent is extended or adjusted under 35 U.S.C. 154(b) by 0 days.

(21) Appl. No.: 09/914,321
(22) PCT Filed: Mar. 15, 2000
(86) PCT No.: PCT/FR00/00627
  § 371 (c)(1),
  (2), (4) Date: Aug. 27, 2001
(87) PCT Pub. No.: WO00/57144
  PCT Pub. Date: Sep. 28, 2000

(30) Foreign Application Priority Data
  Mar. 24, 1999 (FR) ............................................. 99 03683

(51) Int. Cl.⁷ .......................... G01F 23/16; G01F 23/00
(52) U.S. Cl. ........................................ 73/291; 73/290 R
(58) Field of Search .............................. 73/290 R, 291, 73/301, 302

(56) References Cited

U.S. PATENT DOCUMENTS

| 4,034,337 A | * | 7/1977 | Haddock | .................... | 340/63 |
| 4,470,296 A | * | 9/1984 | Kobayashi et al. | ............ | 73/113 |
| 5,803,055 A | * | 9/1998 | Goto et al. | .................. | 123/520 |

FOREIGN PATENT DOCUMENTS

| DE | 195 37 024 | 4/1996 |
| EP | 0 810 113 | 12/1997 |
| EP | 0 838 361 | 4/1998 |
| FR | 2710743 | 4/1995 |
| GB | 2272894 | 6/1994 |

* cited by examiner

Primary Examiner—Hezron Williams
Assistant Examiner—Rodney Frank
(74) Attorney, Agent, or Firm—Connolly Bove Lodge & Hutz LLP

(57) ABSTRACT

An apparatus detects the addition of fuel to a fuel tank of a stopped motor vehicle under conditions of a cut off or running engine. The apparatus detects whether or not the vehicle engine is running and whether or not the tank is closed by a fuel filler cap when a tank is being filled. Vehicle speed is also measured. A first measurement of the level of fuel in the fuel tank is taken when the engine is cut off, or when the fuel filler cap is removed and the vehicle engine is running. A second measurement is taken when the vehicle engine is started up, or when the fuel filler cap is fitted onto the tank and the vehicle engine is running. The addition of fuel to the vehicle fuel tank is detected from the first and second measurements.

4 Claims, 2 Drawing Sheets

DEVICE FOR DETECTING FUEL INPUT IN A MOTOR VEHICLE TANK

FIELD OF THE INVENTION

Background of the Invention

In the context of integrating various functionalities into motor vehicles, it has become necessary to reliably detect the addition of fuel to vehicle fuel tanks.

Now, the devices hitherto used are not absolutely reliable because they use the vehicle ignition signal to trigger the measuring of the fuel level in the fuel tank.

The object of the invention is therefore to solve these problems by providing such a device.

BRIEF DESCRIPTION OF THE INVENTION

To this end, the subject of the invention is a device for detecting the addition of fuel to the fuel tank of a motor vehicle, characterized in that it comprises:

means for detecting whether or not the vehicle engine is running, means for detecting whether or not a fuel filler cap is fitted, closing the vehicle fuel tank, means for measuring the speed of the vehicle, means for measuring the level of fuel in the fuel tank, these means being designed to take a first reading of the level when the engine is cut or when the fuel filler cap is removed and the vehicle speed is zero and the vehicle engine is running and a second reading when the vehicle engine is started up or when the fuel filler cap is fitted when the vehicle speed is zero and the vehicle engine is running, and means for detecting any addition of fuel to the vehicle fuel tank, from the first and second readings taken.

BRIEF DESCRIPTION OF THE FIGURES

The invention will be better understood from reading the description which will follow, which is given merely by way of example and made with reference to the appended drawings, in which.

DETAILED DESCRIPTION OF THE INVENTION

Figure 1:
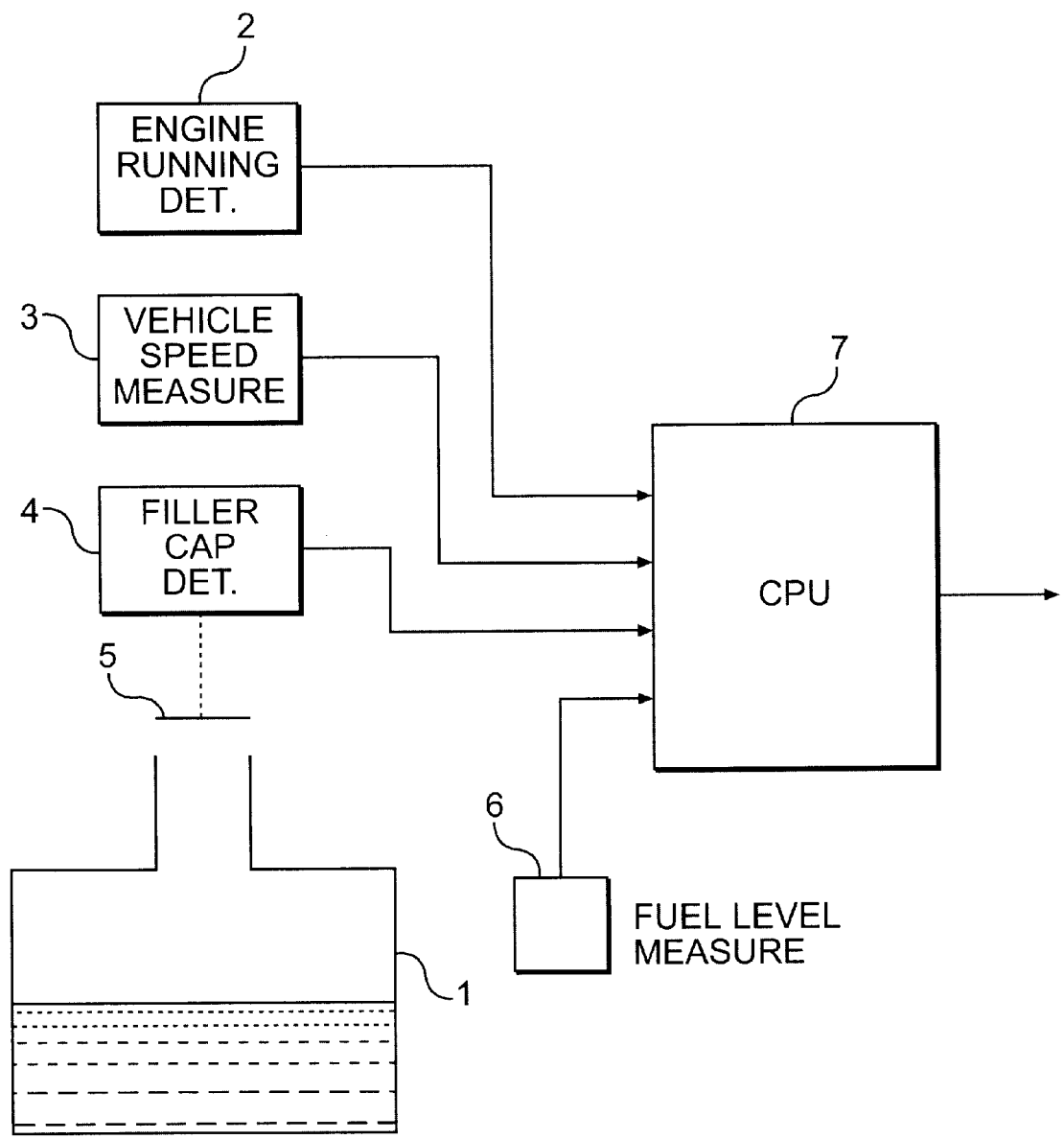
FIG. 1 is a block diagram illustrating the structure of one embodiment of a detection device according to the invention.

This FIG. 1 depicts a device for detecting the addition of fuel to a motor vehicle fuel tank denoted by the general reference 1.

This device comprises means for determining whether or not the vehicle engine is running, these means being denoted by the general reference 2 and comprising any appropriate detection device capable of detecting the starting-up or cutting of the vehicle engine.

The device according to the invention also comprises means for measuring the vehicle speed, these means being denoted by the general reference 3, and means, denoted by the general reference 4, for detecting whether or not a fuel filler cap, denoted by the general reference 5 in this figure, is fitted, closing the vehicle fuel tank 1.

These various means may have any appropriate structure known in the state of the art.

In addition, the device according to the invention also comprises means of a conventional type for measuring the level of fuel in the fuel tank, these means being denoted by the general reference 6.

These various means are connected to an information-processing unit, denoted by the general reference 7, capable of delivering information regarding the addition of fuel to the fuel tank.

In fact, this central information-processing unit 7 is designed to control the operation of the device so that the means 6 for measuring the fuel level take a first reading of the fuel level when the vehicle engine is cut or when the removal of the fuel filler cap is detected when the vehicle speed is zero and the vehicle engine is running and a second reading when the vehicle engine is started up or when the fuel filler cap is fitted while the vehicle speed is zero and the engine of this vehicle is running.

Figure 2:
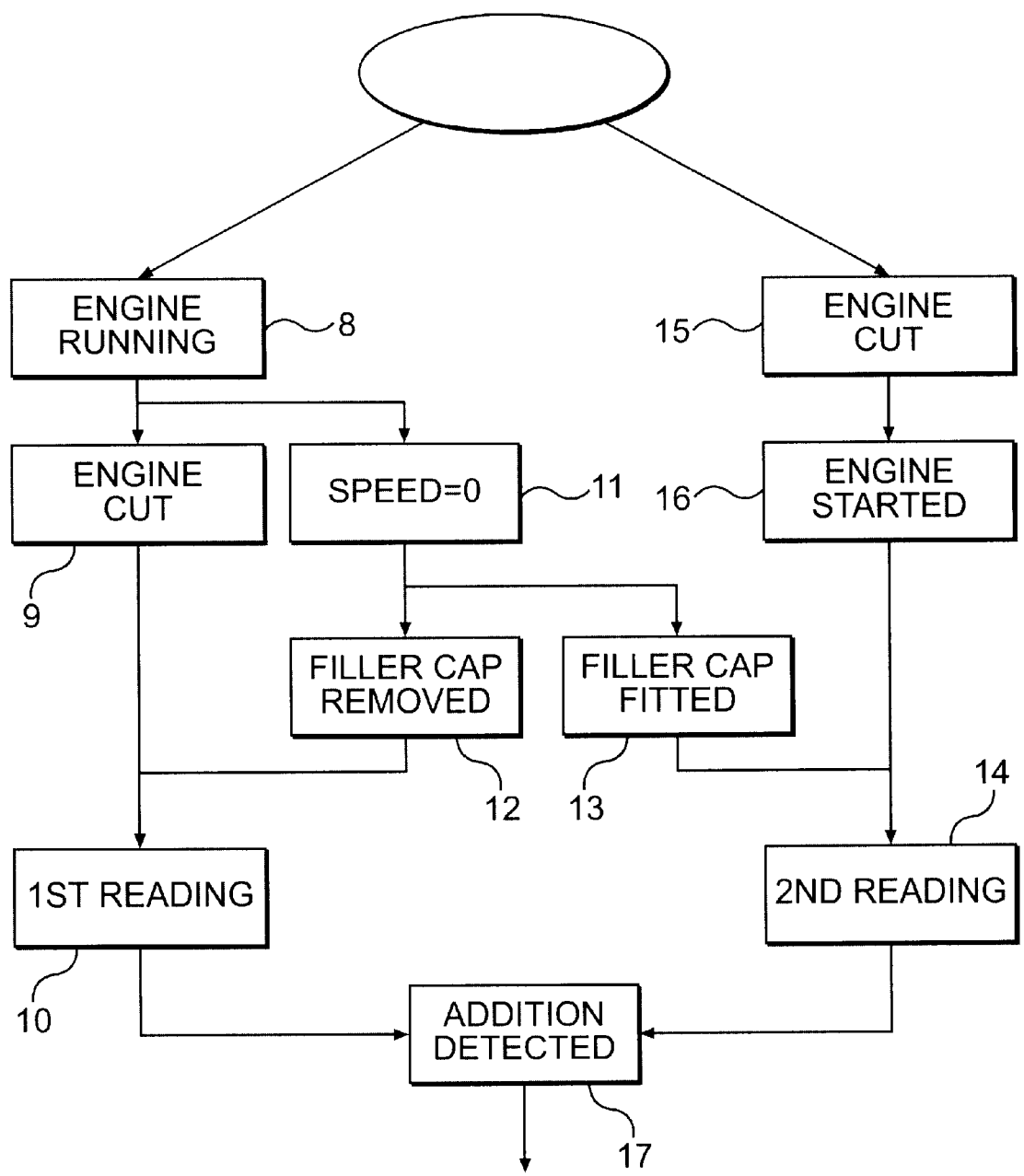
FIG. 2 is a flow chart illustrating the way in which this device works.

This operation is illustrated in FIG. 2, where it may be seen that if the vehicle engine is running, as detected at step 8, then when this engine is cut, as detected at step 9, a first level reading at step 10 is triggered.

This first reading may also be triggered while the engine is running, as detected at step 8, and while the vehicle speed is equal to zero, as detected at step 11, at the instant the filler cap is removed, as detected at step 12.

If the fitting of this filler cap is detected at step 13, while the engine is running and the vehicle speed is equal to zero, then a second level reading at step 14 is triggered.

This second reading may also be triggered while the vehicle engine is cut, as detected at step 15, when the engine is started up, as detected at step 16.

These first and second fuel level readings therefore allow an addition to be detected at step 17.

This device therefore makes it possible to take two readings of the level of fuel in the vehicle fuel tank and allows the information-processing unit 7 to determine any addition of fuel to the fuel tank from these first and second readings.

This makes it possible to detect the addition of fuel extremely reliably in all possible situations that might be encountered in the life of the vehicle.

The various means involved in this detection device may be conventional means already incorporated into vehicles, the means for detecting whether or not the fuel filler cap is fitted comprising, for example, a sensor of the flexible-blade switch type of a conventional kind.

The other means, for their part, are already incorporated into vehicles and the information-processing unit may, for example, be formed of a computer already installed in the vehicle, such as the engine management computer of the latter, for example.

What is claimed is:

1. An apparatus for detecting the addition of fuel to a fuel tank of a stopped motor vehicle under conditions of a cut off or running engine, the apparatus comprising:

means for detecting whether or not the vehicle engine is running;

means for detecting whether or not the tank is closed by a fuel filler cap;

means for measuring the speed of the vehicle;

means for takinga) a first measurement of the level of fuel in the fuel tank when the engine is cut off, or when the fuel filler cap is removed and the vehicle engine is running, and b) a second measurement when the vehicle engine is started up, or when the fuel filler cap is fitted onto the tank and the vehicle engine is running; and means for detecting any addition of fuel to the vehicle fuel tank from the first and second measurements.

2. The apparatus set forth in claim 1 wherein the means for detecting whether or not the fuel filler cap is present comprises a flexible-blade switch sensor.

3. The apparatus set forth in claim 1 wherein the means for detecting the addition of fuel comprise a central processing unit.

4. A method for detecting the addition of fuel to a fuel tank of a stopped motor vehicle under conditions of a cut off or running engine, the method comprising:

detecting whether or not the vehicle engine is running;

detecting whether or not the tank is closed by a fuel filler cap;

measuring the speed of the vehicle;

taking measurements, including-
- a) first measurement of the level of fuel in the fuel tank when the engine is cut off, or when the fuel filler cap is removed and the vehicle engine is running, and
- b) a second measurement when the vehicle engine is started up, or when the fuel filler cap is fitted onto the tank and the vehicle engine is running; and detecting any addition of fuel to the vehicle fuel tank from the first and second measurements.

\* \* \* \* \*